July 10, 1928.

J. A. WILSON

GOGGLES

Filed Dec. 1, 1926

1,676,760

INVENTOR
J. Alexander Wilson
BY
ATTORNEY

Patented July 10, 1928.

1,676,760

UNITED STATES PATENT OFFICE.

JOHN ALEXANDER WILSON, OF WINDSOR, ONTARIO, CANADA.

GOGGLES.

Application filed December 1, 1926. Serial No. 151,990.

This invention relates to improvements in goggles which may be advantageously employed for such purposes as night driving, and which are primarily intended to protect the eyes of the wearer against the glare of approaching headlights, though obviously their scope may be extended to cover other uses.

It is an object of the invention to provide goggles having a plurality of colored lens sections of varying shades in each lens ring, so that the lens sections may be mounted in the usual grooves provided in the lens rings or frames of ordinary goggles; and moreover to so proportion these colored lens sections that they only occupy part of each lens ring and leave part of each ring free so that a normal view of the road may be obtained therethrough. These latter ring parts may either be unoccupied or filled with plain transparent material.

Another object of the invention is to provide goggles having lens sections of varying shades of color which do not occupy the whole of the lens rings and so proportioned therein that: firstly, the wearer may look through the unoccupied or plain glass portions of the rings or frames at the road ahead and have his eyes protected from distant headlights by the lighter colored lens sections, and also from headlights close at hand which have passed over to his left side, by the darker colored lens sections; secondly, the wearer may look directly through the lighter colored lens portions when several cars are approaching and their lights sufficiently illuminate the road for a clear and sufficient view to be obtained through the lens sections, at the same time utilizing the darker lens sections to shield his eyes from any blinding effect of lights close at hand which would be on his left; or thirdly, the wearer may look directly through the darker colored portions. So that the wearer may utilize the various lens sections in such a manner that they will at all times afford ample protection against glare without hindering the user from seeing other objects on the road.

Figure 1:
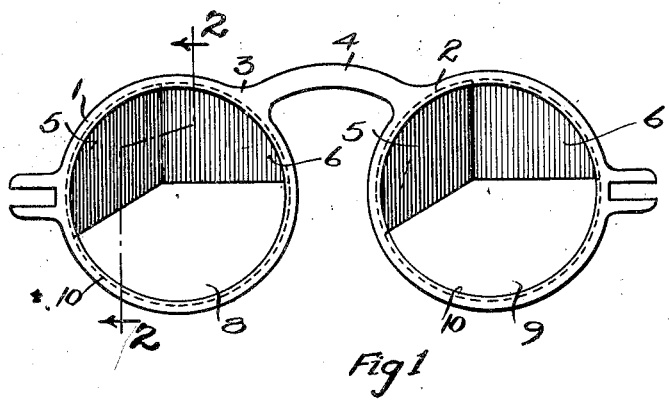
Figure 2:
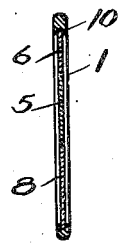

Having thus briefly outlined the major objects of the invention I will now proceed to describe an embodiment thereof with the aid of the accompanying drawings, in which:

Figure 1 illustrates a front view of a pair of goggles provided with my lens arrangement, and Figure 2 is a section on the line 2—2 of Figure 1.

Referring to the drawings, 1 designates the left and 2 the right lens ring of the goggles 3, which are usually held in spaced relation to one another by a bridge 4.

A lens section 5 consisting of substantially transparent material of a darker shade is arranged generally in the upper left side of each of the lens rings or frames 1 and 2, and a second lens section 6 of substantially transparent material of a lighter color or shade is mounted usually in the upper right side of each of the lens rings adjacent to the aforesaid sections 5. These lens sections 5 and 6 may either be separate or made in one piece, when separate pieces are employed their adjacent edges should be substantially in contact with one another. It will also be noted that the lighter sections 6 extend preferably just beyond the vertical centre line of the lens rings and that their lower margins terminate somewhat above the horizontal centre lines of the lens rings. The darker sections 5 are preferably provided with lower margins which taper downwards towards their lens rings.

The lower portion of each of the lens rings has no colored material therein; either plain transparent material may be utilized therein as indicated at 8 in the lens ring 1, or else this space may be left unoccupied as shown at 9 in the lens ring 2.

The wearer will find that when looking ahead normally that he will see through the lower portion of each lens ring and thereby obtain a normal view of the road.

When lights first appear in the distance by lowering the head slightly the lighter colored sections 6 will counteract any glaring effect, then as the lights come nearer they pass to the left side as their intensity increases and then the darker sections 5 come into play and afford greater protection to the eyes. Or again by lowering the head a little more a sufficient view of the road ahead can often be obtained when a number of lights are approaching simultaneously as their illumination will afford a good view of the whole width of the road when looking through the lighter colored sections 6. In the latter case the darker sections 5 automatically come into play and cut out the more intense light of passing cars on the wearer's left.

The lens sections 5, 6, and 8, when the latter are employed, may consist of glass or any other substantially transparent material, and as all the sections are arranged in the same vertical plane ordinary grooves 10 of any standard make of lens rings may be utilized to hold them.

Moreover it is understood that while a preferred embodiment of the invention has been described and shown it is understood that the arrangement of the lens portions may be varied to suit conditions, provided the said alterations fall within the scope of the appended claims.

What I claim as my invention and desire to secure by Letters Patent is:

1. In an arrangement of the character described, the combination of two lens frames held in spaced relation to one another, a lens section of darker colored substantially transparent material mounted in the upper side of each lens frame, a lens section of lighter colored substantially transparent material mounted in the other upper side of each lens frame, a plain transparent lens section mounted in the lower portion of each lens frame, and all of said lens sections in each ring being in the same plane, and having their adjacent margins substantially in contact with one another.

2. In an arrangement of the character described, the combination of two lens frames held in spaced relation to one another, a lens section of darker colored substantially transparent material in one upper side of each lens frame adapted to obstruct glare from headlights close at hand, a lens section of lighter colored substantially transparent material in the other upper side of each lens frame adapted to intercept light from headlights further away, the darker and lighter lens sections in each lens frame being contiguous to one another, and said darker and lighter lens sections having their lower margins so positioned that the wearer may look under them and obtain unobstructed vision.

3. In an arrangement of the character described, the combination of two lens frames held in spaced relation to one another, a lens section of darker colored substantially transparent material in the left upper side of each lens frame adapted to obstruct glare from headlights close at hand which have passed over to the left side of the wearer, and a lens section of lighter colored substantially transparent material in the right upper side of each lens frame adapted to intercept glare from more distant headlights directly ahead of the wearer, said darker and lighter lens sections in each frame being contiguous to one another.

J. ALEXANDER WILSON.